(12) United States Patent
Abrari

(10) Patent No.: US 11,898,462 B2
(45) Date of Patent: Feb. 13, 2024

(54) IMPELLER FOR AIRCRAFT ENGINE

(71) Applicant: PRATT & WHITNEY CANADA CORP., Longueuil (CA)

(72) Inventor: Farid Abrari, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 21 days.

(21) Appl. No.: 17/451,958

(22) Filed: Oct. 22, 2021

(65) Prior Publication Data

US 2023/0127604 A1  Apr. 27, 2023

(51) Int. Cl.
*F01D 5/28* (2006.01)
*F01D 5/04* (2006.01)
(Continued)

(52) U.S. Cl.
CPC .............. *F01D 5/28* (2013.01); *F01D 5/043* (2013.01); *F01D 5/30* (2013.01); *F01D 9/026* (2013.01);
(Continued)

(58) Field of Classification Search
CPC ... F01D 5/28; F01D 5/043; F01D 5/30; F01D 9/026; F01D 5/046; F01D 5/025; F01D 5/048; F04D 29/444; F04D 29/624; F04D 29/023; F04D 29/284; F05D 2220/323; F05D 2240/30; F05D 2300/133; F05D 2260/94; F05D 2300/174; F16D 1/04; F16D 1/08; G01N 2203/0069; G01N 2203/0071; B23P 15/04; Y10T 29/49316
See application file for complete search history.

(56) References Cited

U.S. PATENT DOCUMENTS 4,273,512 A * 6/1981 Weiler .................. F04D 29/023
29/889.4
4,787,821 A 11/1988 Cruse et al.
(Continued)

FOREIGN PATENT DOCUMENTS

CN 103967837 B * 1/2017
KR 20130116677 A * 11/2013 ........... F04D 29/002

OTHER PUBLICATIONS

Zhang, Zebang; Balint, Daniel; Dunne, Fionn; "Dwell fatigue in two Ti alloys: An integrated crystal plasticity and discrete dislocation study", Aug. 12, 2016, Journal of Mechanics and Physics of Solids, vol. 96, pp. 411-427 (Year: 2016).*

*Primary Examiner* — Woody A Lee, Jr.
*Assistant Examiner* — Eric A Lange
(74) *Attorney, Agent, or Firm* — NORTON ROSE FULBRIGHT CANADA LLP

(57) ABSTRACT

An impeller for a centrifugal compressor, the impeller rotatable about a central axis, has: an outer hub body including a first material and extending around the central axis, the outer hub body defining a gaspath face extending from an inlet to an outlet, the gaspath face extending radially away from the central axis from the inlet to the outlet; blades protruding from the gaspath face and circumferentially distributed around the central axis; and an inner hub body extending around the central axis, the inner hub body secured to the outer hub body, the outer hub body axially overlapping and extending around the inner hub body, the inner hub body made of a second material being more cold dwell resistant than the first material.

17 Claims, 2 Drawing Sheets

(51) Int. Cl.
  *F01D 5/30* (2006.01)
  *F01D 9/02* (2006.01)
  *F04D 29/44* (2006.01)

(52) U.S. Cl.
  CPC ...... *F04D 29/444* (2013.01); *F05D 2220/323* (2013.01); *F05D 2240/30* (2013.01); *F05D 2300/133* (2013.01)

(56) References Cited

U.S. PATENT DOCUMENTS

| | | | |
|---|---|---|---|
| 6,499,953 B1* | 12/2002 | Bellerose | F04D 29/285 416/175 |
| 6,935,840 B2 | 8/2005 | Romani et al. | |
| 7,841,506 B2* | 11/2010 | Hall | F01D 5/3061 228/113 |
| 8,137,075 B2 | 3/2012 | Howe et al. | |
| 2008/0124210 A1* | 5/2008 | Wayte | F01D 5/02 415/115 |
| 2013/0004316 A1* | 1/2013 | Matwey | F04D 29/285 416/198 A |

\* cited by examiner

IMPELLER FOR AIRCRAFT ENGINE

TECHNICAL FIELD

The application relates generally to aircraft engines, such as gas turbine engines and, more particularly, to compressors of such aircraft engines.

BACKGROUND OF THE ART

Impellers of compressors of aircraft engines are subjected to temperature gradients, which may limit the choice of materials used to manufacture them. Cold portions of the impellers may be prone to cold dwell whereas hot portions may be prone to creep. Materials that are resistant to cold dwell may not be able to withstand hot temperatures and may limit outlet air temperatures of the compressor. Improvements are sought.

SUMMARY

In one aspect, there is provided an impeller for a centrifugal compressor, the impeller rotatable about a central axis, comprising: an outer hub body including a first material and extending around the central axis, the outer hub body defining a gaspath face extending from an inlet to an outlet, the gaspath face extending radially away from the central axis from the inlet to the outlet; blades protruding from the gaspath face and circumferentially distributed around the central axis; and an inner hub body extending around the central axis, the inner hub body secured to the outer hub body, the outer hub body axially overlapping and extending around the inner hub body, the inner hub body made of a second material being more cold dwell resistant than the first material.

The impeller may include any of the following features, in any combinations.

In some embodiments, the first material is more creep resistant than the second material.

In some embodiments, the first material is Ti-834.

In some embodiments, the second material is Ti-6246.

In some embodiments, the impeller has a front face and a rear face axially rearward of the front face, the inner hub body defining the front face, the outer hub body defining at least a portion of the rear face.

In some embodiments, an entirety of the rear face is defined by the outer hub body.

In some embodiments, the inner hub body has an outer face facing an inner face of the outer hub body.

In some embodiments, an annular gap is between the outer face and the inner face.

In some embodiments, the annular gap extends radially towards the central axis as the annular gap extends axially toward the outlet.

In some embodiments, the outer hub body is secured to the inner hub body via at least two attachment locations being axially offset from one another.

In some embodiments, the outer hub body is free of contact with the inner hub body between the at least two attachment locations.

In some embodiments, the at least two attachment locations include a fore attachment location and a rear attachment location, the rear attachment location located radially inwardly from the fore attachment location.

In some embodiments, the outer hub body is secured to the inner hub body via a front tongue-and-groove connection proximate a front face of the impeller and a rear tongue-and-groove connection proximate a rear face of the impeller.

In another aspect, there is provided an aircraft engine comprising: a compressor having an impeller rotatable about a central axis, the impeller having: an outer hub body including a first material and extending around a central axis, the outer hub body defining a gaspath face extending from an inlet to an outlet, the gaspath face extending radially away from the central axis from the inlet to the outlet; blades protruding from the gaspath face and circumferentially distributed around the central axis; and an inner hub body extending around the central axis, the inner hub body secured to the outer hub body, the inner hub body contained within a recess defined by the outer hub body, the inner hub body made of a second material being more cold dwell resistant than the first material.

The aircraft engine may include any of the following features, in any combinations.

In some embodiments, the first material is more creep resistant than the second material.

In some embodiments, the impeller has a front face and a rear face axially rearward of the front face, the inner hub body defining the front face, the outer hub body defining at least a portion of the rear face, an entirety of the rear face is defined by the outer hub body.

In some embodiments, the inner hub body has an outer face facing an inner face of the outer hub body, an annular gap between the outer face and the inner face.

In some embodiments, the outer hub body is secured to the inner hub body via at least two attachment locations being axially offset from one another.

In some embodiments, the outer hub body is secured to the inner hub body via a front tongue-and-groove connection proximate the front face of the impeller and a rear tongue-and-groove connection proximate the rear face of the impeller.

In some embodiments, the first material is Ti-834 and wherein the second material is Ti-6246.

DESCRIPTION OF THE DRAWINGS

Reference is now made to the accompanying figures in which.

DETAILED DESCRIPTION

Figure 1:
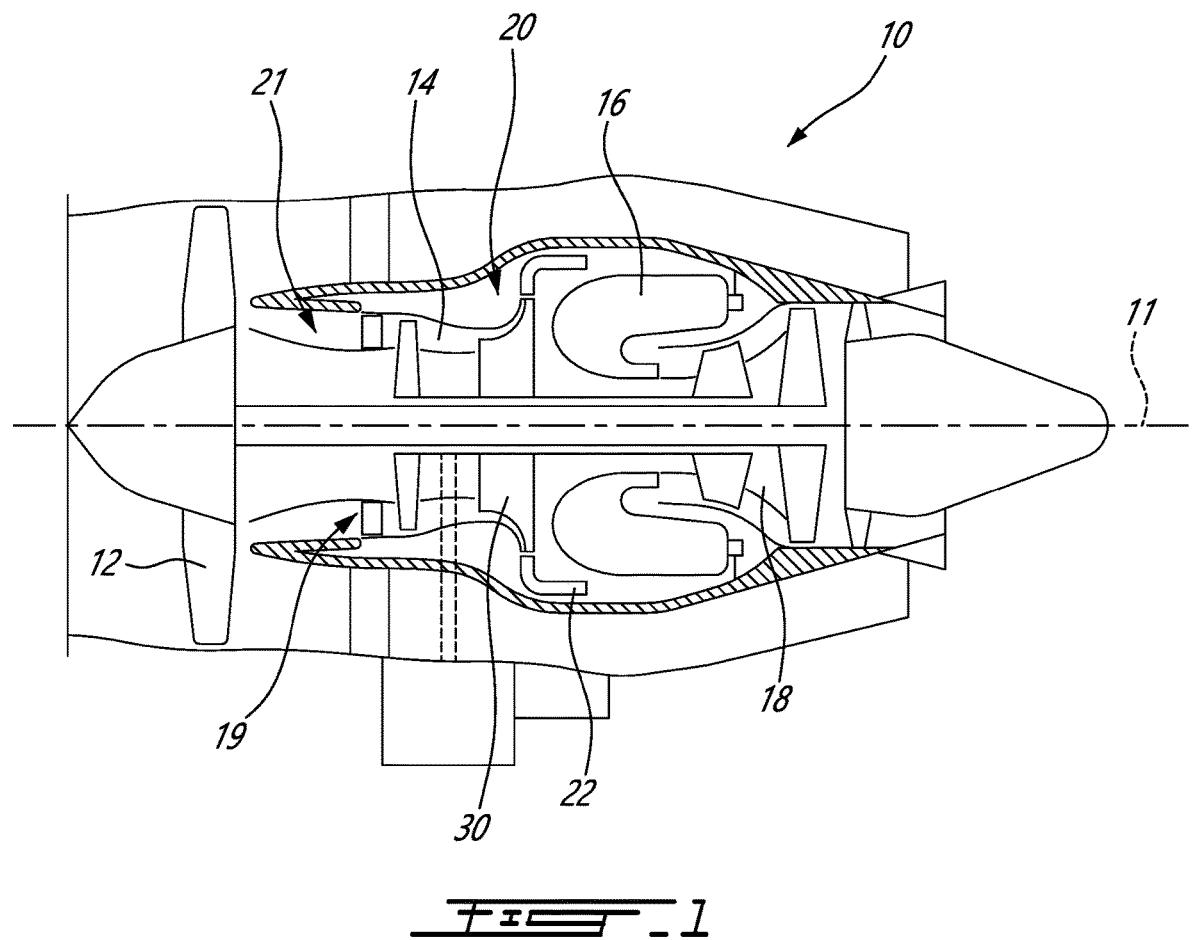
FIG. 1 is a schematic cross-sectional view of an exemplary aircraft engine depicted as gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 rotate about a central axis 11 of the gas turbine engine 10.

The compressor section 14 includes an axial compressor 19, which may include one or more stage, each including stator vanes and rotor blades. The compressor section 14 further includes a centrifugal compressor 20 located downstream of the axial compressor 19 relative to a flow in a core flow path 21 of the gas turbine engine 10. The centrifugal compressor 20 includes an impeller 30 and a diffuser 22 located downstream of the impeller 30. The axial compressor 19 may be referred to as a low-pressure compressor whereas the centrifugal compressor 20 may be referred to as a high-pressure compressor.

Typically, impellers are made of a monolithic body defining a hub and blades protruding from the hub. In use, air flows from an inlet of the impeller to an outlet and between the blades. As the air is being compressed, its temperature increases. Therefore, a front face of the impeller is exposed to colder air than a rear face of the impeller. This may create temperature gradients that may lead to low cycle fatigue issues. Moreover, portions of the impeller may operate at temperatures that is more prone to cold dwell. This may happen in regions of the impeller being below a temperature threshold, which may be about 450 Fahrenheit. Therefore, the impeller may be made entirely of a material that is resistant to cold dwell. This material may be, for instance, Ti-6246.

Some titanium alloys may be susceptible to cold dwell because of subsurface micro texture region (MTR). Failure of the impeller may be exasperated when a critical component undergoes long periods of dwell below of certain temperature threshold (e.g., 450 Fahrenheit). Within titanium alloys, Ti-6246 may be the least susceptible to cold dwell and Ti-834 may be the most prone to cold dwell. Hence, to avoid cold dwell, impellers could be manufactured out of titanium alloys, such as Ti-6246.

However, this material may be susceptible to creep above a given temperature threshold, which may be about 450 Fahrenheit. Hence, Ti-6246 may limit a temperature of the air that exits the impeller. In some situations, it may be desired to inject air at a higher temperature in the combustor 16 since this may lead to efficiency and performance gains. A solution may be to use another material, such as Ti-834 that is able to withstand higher temperatures without creeping. However, as explained above, Ti-834 may be susceptible to cold dwell. Thus, colder regions of the impeller may present cold dwell issues during use if such colder regions are manufacture out of Ti-834.

In the context of the present disclosure, "creep" corresponds to a tendency of a solid material to move slowly or deform permanently under the influence of persistent mechanical stresses. It may occur as a result of long-term exposure to high levels of stress that are still below the yield strength of the material. Creep may be more severe in materials that are subjected to heat for long periods and generally increases as they near their melting point. The rate of deformation is a function of the material's properties, exposure time, exposure temperature and the applied structural load. Depending on the magnitude of the applied stress and its duration, the deformation may become so large that a component can no longer perform its function. Creep is usually of concern when evaluating components that operate under high stresses and/or high temperatures. Unlike brittle fracture, creep deformation does not occur suddenly upon the application of stress. Instead, strain accumulates as a result of long-term stress. Therefore, creep is a "time-dependent" deformation.

In the context of the present disclosure, "cold dwell" refers to the reduction in the fatigue life-time of a component as a result of exposing the component to a constant high mean stress during cruising, between the ramping up of the load, during take-off for instance, and the ramping down of the load, on landing for instance. The "cold" of cold dwell fatigue refers to the fact that this phenomenon may happen at temperatures of around 100 degrees Celsius or less, in a relatively cold part of the impeller. Cold dwell fatigue complexity raises a host of fundamental questions about plasticity, creep and fracture in titanium and its alloys. Many metallurgical factors may affect cold dwell fatigue: alloy composition: the most susceptible Ti alloys are those containing high volume fractions of the alpha (HCP) phase and low volume fractions of the beta (BCC) phase); microstructure: the most susceptible alloys contain clusters of alpha grains that have small misorientations between them (microtexture); duration of the dwell and the loading during the dwell; creep; fracture morphology: the crack initiates below the surface of the specimen and consists of facets almost parallel to the basal plane of the alpha phase.

Figure 2:
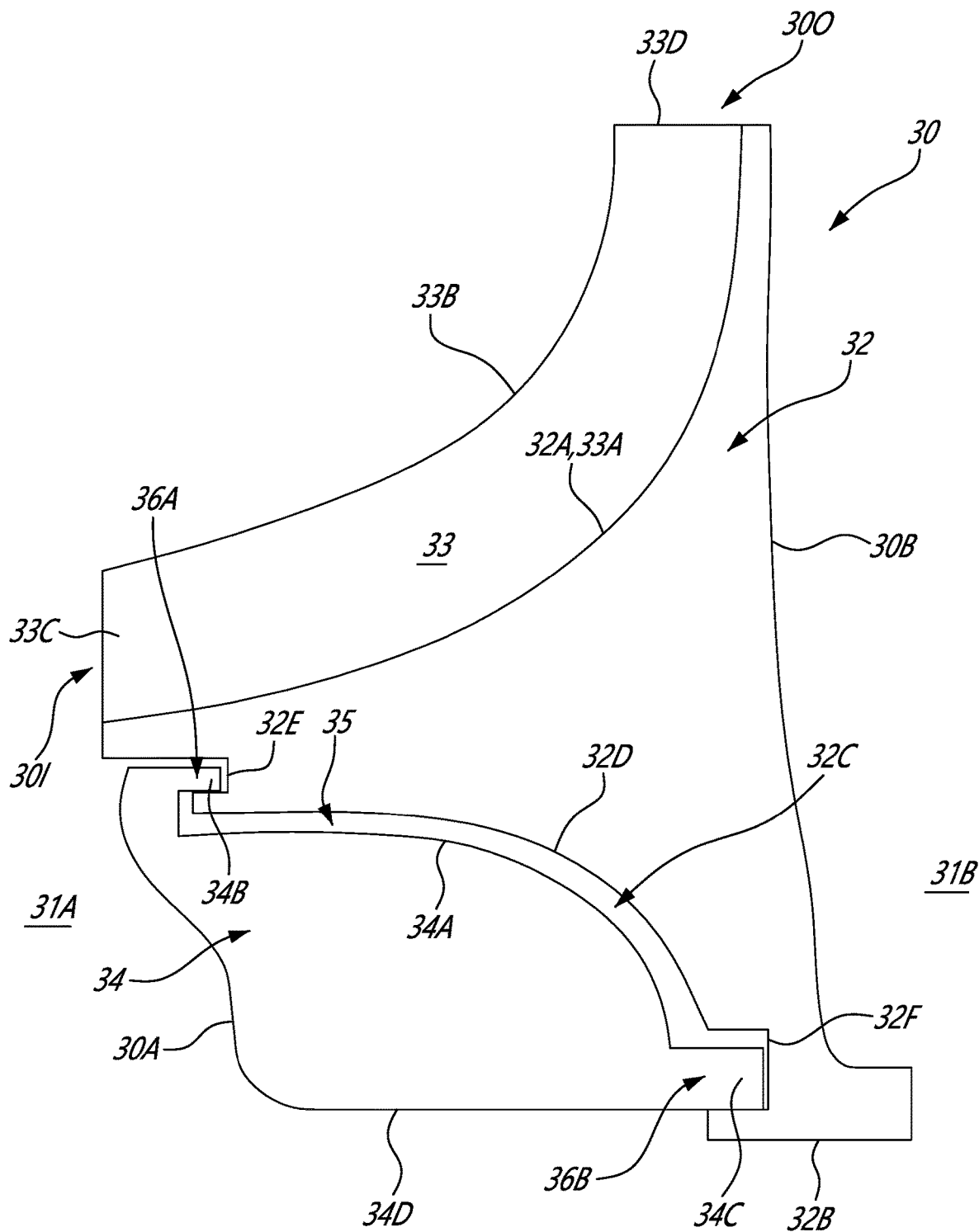
FIG. 2 is a cross-sectional view of an impeller of a compressor section of the gas turbine engine of FIG. 1.

Referring now to FIG. 2, the impeller 30 is shown in greater detail. The impeller 30 may at least partially alleviate the aforementioned drawbacks. The impeller 30 may be made of two bodies 32, 34 each made of a respective material. A first one of these two materials is selected for its creep resistance and a second one of these two materials is selected for its cold dwell resistance.

The impeller 30 has a front face 30A and a rear face 30B. The impeller 30 has an inlet 30I and an outlet 30O. The front face 30A is proximate the inlet 30I and the rear face 30B is proximate the outlet 30O. In use, the front face 30A is facing a front cavity 31A and the rear face 30B is facing a rear cavity 31B. A temperature of the air in the front cavity 31A is less than that in the rear cavity 31B. Typically, the air in the rear cavity 31B and being in contact with the rear face 30B of the impeller 30 may be at about 450 Fahrenheit and above. Hence, thermal gradients may be present within the impeller between the front face 30A and the rear face 30B.

The impeller 30 includes an outer hub body 32 including a first material. In some embodiments, the outer hub body 32 may be made entirely of the first material. The outer hub body 32 extends around the central axis 11. The outer hub body 32 may extend annularly around a full circumference around the central axis 11. The outer hub body 32 defines a gaspath face 32A that extends from the inlet 30I to the outlet 30O of the impeller 30. The gaspath face 32A extends radially away from the central axis 11 from the inlet 30I to the outlet 30O such that the flow deviates away from the central axis 11 as it is being compressed. The outer hub body 32 may define a bore 32B for receiving a shaft of the gas turbine engine 10. The outer hub body 32 may define a recess 32C that extends axially between the front face 30A and the rear face 30B.

The impeller 30 includes blades 33 protruding from the gaspath face 32A and circumferentially distributed around the central axis 11. The blades 33 extends from roots 33A at the gaspath face 32A of the outer hub body 32 to tips 33B and from leading edges 33C at the inlet 30I to trailing edges 33D at the outlet 30O. The blades 33 have opposed pressure and suction sides. Flow passages are defined between the blades 33. The flow passages may curve from extending substantially axially at the inlet 30I to extending substantially radially at the outlet 30O.

The impeller 30 further includes an inner hub body 34 including a second material. In some embodiments, the inner hub body 34 may be made entirely of the second material. The inner hub body 34 extends around the central axis 11. The inner hub body 34 may extend annularly a full circumference around the central axis 11. The inner hub body 34 is received within the recess 32C such that the outer hub body 32 axially overlaps the inner hub body 34 and that the outer hub body 32 extends around the inner hub body 34. The inner hub body 34 is secured to the outer hub body 32. Thermal gradients in the impeller 30 may be lower than one-piece impellers. Therefore, the outer hub body 32 may be operating above cold dwell threshold and inner hub body 34 may be operating below cold dwell threshold.

In the embodiment shown, the second material of the inner hub body 34 is more cold dwell resistant than the first material of the outer hub body 32. The first material of the outer hub body 32 may be more creep resistant than the second material of the inner hub body 34 at an operational temperature of the impeller 30. The first material may be, for instance, Ti-834 and the second material may be, for instance, Ti-6246. Therefore, the impeller 30 uses the first material, which may be Ti-834, for the outer hub body 32 thereby allowing higher outlet air temperatures and uses the second material, which may be Ti-6246, for the inner hub body 34, which may be less prone to cold dwell than the first material. Thus, each of the hot and cold portions of the impeller 30, corresponding respectively to the outer hub body 32 and the inner hub body 34, is made of a material able to resist a specific phenomenon associated with these temperatures, that is, the creep and the cold dwell.

Cold dwell is a phenomenon that, as explained above, arises with some engine parts exposed to colder engine temperatures, typically below about 450 Fahrenheit. Hence, even if a given material is susceptible to cold dwell, it may not be a problem if said material is being used in a location of the gas turbine engine where its temperature is expected to be more than 450 Fahrenheit. Creep, as explained above, is exacerbate with an increase in temperature. Therefore, the first material of the outer hub body 32 would be susceptible to cold dwell if it were used for the inner hub body 34, but, since it is used for the outer hub body 32 being, in operation, at a temperature higher than about 450 Fahrenheit, cold dwell may not be an issue.

Still referring to FIG. 2, the inner hub body 34 defines a major portion, that is at least half, of the front face 30A of the impeller 30. A major portion, that is at least half, of the rear face 30B of the impeller 30 may be defined by the outer hub body 32. In the embodiment shown, an entirety of the rear face 30B is defined by the outer hub body 32. Hence, the inner hub body 34 of the impeller 30 may be free of exposure to the air flowing within flow passages defined between the blades 33 and along the gaspath face 32A of the outer hub body 32. The inner hub body 34 may be further free of exposure to the air in the rear cavity 31B located rearward of the impeller 30. Therefore, in use, the temperature of the inner hub body 34 may remain below 450 Fahrenheit, where it may not be susceptible to creep, and a temperature of the outer hub body 32 may remain above 450 Fahrenheit, where it may not be susceptible to cold dwell.

It will be appreciated that, in some embodiments, all parts of the impeller 30 located radially inwardly of a radial position of the gaspath face 32A at the inlet 30I of the impeller 30 may be defined by the inner hub body 34.

In the embodiment shown, an annular gap 35 is defined between an inner face 32D of the outer hub body 32 and an outer face 34A of the inner hub body 34. The inner face 32D oriented toward the inner hub body 34 and the outer face 34A being oriented toward the outer hub body 32. This annular gap 35 may contain air and may help in limiting heat from being transferred from the outer hub body 32 to the inner hub body 34. As shown, the annular gap 35 extends radially towards the central axis 11 as the annular gap 35 extends axially toward the rear face 30B and axially toward the outlet 30O of the impeller 30. This may have the effect of maximising the area of the front face 30A of the impeller 30 that is defined by the inner hub body 34 and to maximize the area of the rear face 30B of the impeller 30 that is defined by the outer hub body 32.

The inner hub body 34 is secured to the outer hub body 32 at two attachment locations, which include a fore attachment location 36A and a rear attachment location 36B, which may be axially offset from the fore attachment location 36A relative to the central axis 11. In some cases, more or less than two attachment locations may be used. As shown, the inner hub body 34 is free of contact with the outer hub body 32 between the two attachment locations 36A, 36B. The two attachment locations 36A, 36B are herein axially and radially offset from one another. The fore attachment location 36A is located proximate the front face 30A of the impeller 30 and located radially outwardly of the rear attachment location 36B, which is located proximate the rear face 30B of the impeller 30.

The fore and rear attachment locations 36A, 36B include each a tongue-and-groove connection between the outer hub body 32 and the inner hub body 34. More specifically, the outer hub body 32 defines a fore groove 32E and a rear groove 32F whereas the inner hub body 34 defines a fore tab 34B and a rear tab 34C. The fore tab 34B is received within the fore groove 32E and the rear tab 34C is received within the rear groove 32F. Tight fit engagements may be defined between the fore and rear tabs 34B, 34C and the outer hub body 32. More specifically, the fore and rear tabs 34B, 34C may be biased radially inwardly against the outer hub body 32 to limit the outer hub body 32 from moving radially outwardly relative to the inner hub body 34. In other words, radially inner faces of the fore and rear tabs 34B, 34C, which face a radially inward direction, may be in a tight fit engagement against radially outer faces of the outer hub body 32; the radially outer faces facing a radially outward direction toward the fore and rear grooves 32E, 32F. It will be appreciated that, alternatively, the tabs may be defined by the outer hub body 32 and the grooves may be defined by the inner hub body 34. Any other suitable means may be used to secure the outer hub body 32 to the inner hub body 34 such as, for instance, keyway engagement, dog and slot, fasteners, threaded connections, and so on.

The disclosed impeller 30 may not exhibit a trihub failure mode as those of one-piece impellers. The reason is that any cracks emanating from the outer hub body 32, typically from the rear face 30C and towards a bore 34D of the inner hub body 34 or from the bore 34D of the inner hub body 34 toward the rear face 30B may be stopped at the interface (e.g., annular gap 35) of the two pieces. If failure of the outer hub body 32 at the rear face 30B were to occur, it would lead to fragments smaller than one-piece trihub. If failure of the inner hub body 34 were to occur at the bore 34D, unlike the one-piece impeller, it would be contained by the outer hub body 32 since the outer hub body 32 extends around and contains the inner hub body 34. Moreover, due to superior hot creep properties of the first material of the outer hub body 32, the chance of creep-fatigue interaction (CFI) may be reduced for a given compressor outlet temperature compared to a one-piece impeller. Therefore, the impeller 30 may address both the cold dwell and CFI. This may allow to open design space for aircraft engines with higher compressor outlet temperatures.

The embodiments described in this document provide non-limiting examples of possible implementations of the present technology. Upon review of the present disclosure, a person of ordinary skill in the art will recognize that changes may be made to the embodiments described herein without departing from the scope of the present technology.

For example, a similar impeller having two bodies may be used in a turbine section of an aircraft engine. Yet further modifications could be implemented by a person of ordinary skill in the art in view of the present disclosure, which modifications would be within the scope of the present technology.

The invention claimed is:

1. An impeller for a centrifugal compressor, the impeller rotatable about a central axis, comprising:
   a front face and a rear face axially rearward of the front face, the rear face extending radially outwardly relative to the central axis from a bore of the impeller, the impeller having an inlet and an outlet downstream of the inlet, the impeller having a gaspath face extending from the inlet to the outlet;
   an outer hub body including a first material and extending around the central axis, the outer hub body defining an entirety of the gaspath face, the gaspath face extending radially away from the central axis from the inlet to the outlet, an entirety of the rear face defined by the outer hub body;
   blades protruding from the gaspath face and circumferentially distributed around the central axis; and
   an inner hub body extending around the central axis, the inner hub body secured to the outer hub body, the outer hub body axially overlapping and extending around the inner hub body, the inner hub body made of a second material being more cold dwell resistant than the first material, the inner hub body located entirely radially inwardly of the gaspath face.

2. The impeller of claim 1, wherein the first material is more creep resistant than the second material.

3. The impeller of claim 1, wherein the first material is Ti-834.

4. The impeller of claim 3, wherein the second material is Ti-6246.

5. The impeller of claim 1, wherein the inner hub body defines the front face.

6. The impeller of claim 1, wherein the inner hub body has an outer face facing an inner face of the outer hub body.

7. The impeller of claim 6, comprising an annular gap between the outer face and the inner face.

8. The impeller of claim 7, wherein the annular gap extends radially towards the central axis as the annular gap extends axially toward the outlet.

9. The impeller of claim 1, wherein the outer hub body is secured to the inner hub body via at least two attachment locations being axially offset from one another.

10. The impeller of claim 9, wherein the outer hub body is free of contact with the inner hub body between the at least two attachment locations.

11. The impeller of claim 10, wherein the at least two attachment locations include a fore attachment location and a rear attachment location, the rear attachment location located radially inwardly from the fore attachment location.

12. The impeller of claim 10, wherein the outer hub body is secured to the inner hub body via a front tongue-and-groove connection proximate a front face of the impeller and a rear tongue-and-groove connection proximate a rear face of the impeller.

13. An aircraft engine comprising:
   a compressor having an impeller rotatable about a central axis, the impeller having an inlet and an outlet downstream of the inlet, the impeller having a gaspath face extending from the inlet to the outlet, the impeller having:
      a front face and a rear face axially rearward of the front face, the rear face extending radially outwardly relative to a central axis from a bore of the impeller, the impeller having an inlet and an outlet downstream of the inlet, the impeller having a gaspath face extending from the inlet to the outlet;
      an outer hub body including a first material and extending around the central axis, the outer hub body defining an entirety of the gaspath face, an entirety of the rear face defined by the outer hub body;
      blades protruding from the gaspath face and circumferentially distributed around the central axis; and
      an inner hub body extending around the central axis, the inner hub body secured to the outer hub body, the inner hub body contained within a recess defined by the outer hub body, the inner hub body made of a second material being more cold dwell resistant than the first material, the inner hub body having an outer face facing an inner face of the outer hub body, an annular gap between the outer face and the inner face, the inner hub body located entirely radially inwardly of the gaspath face.

14. The aircraft engine of claim 13, wherein the first material is more creep resistant than the second material.

15. The aircraft engine of claim 13, wherein the outer hub body is secured to the inner hub body via at least two attachment locations being axially offset from one another.

16. The aircraft engine of claim 15, wherein the outer hub body is secured to the inner hub body via a front tongue-and-groove connection proximate the front face of the impeller and a rear tongue-and-groove connection proximate the rear face of the impeller.

17. The aircraft engine of claim 16, wherein the first material is Ti-834 and wherein the second material is Ti-6246.

* * * * *